(12) United States Patent
Johnson et al.

(10) Patent No.: US 7,701,617 B2
(45) Date of Patent: Apr. 20, 2010

(54) PRINTING METHODS AND APPARATUS FOR PROVIDING PRINTED FORMS

(75) Inventors: Bruce L. Johnson, Eagle, ID (US); Bradley J. Anderson, Boise, ID (US); Leonard Thomas Schroath, Boise, ID (US); William I. Herrmann, Eagle, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1239 days.

(21) Appl. No.: 10/400,984

(22) Filed: Mar. 27, 2003

(65) Prior Publication Data

US 2004/0190013 A1 Sep. 30, 2004

(51) Int. Cl.
G06F 3/12 (2006.01)
G06K 15/02 (2006.01)
H04N 1/00 (2006.01)
H04N 1/23 (2006.01)
H04N 1/32 (2006.01)

(52) U.S. Cl. .......... 358/406; 358/1.1; 358/296; 358/401; 358/468

(58) Field of Classification Search .......... 358/500, 358/1.6; 700/233, 235, 241; 705/14; 221/6
See application file for complete search history.

(56) References Cited

U.S. PATENT DOCUMENTS

| | | | | |
|---|---|---|---|---|
| 4,361,320 A * | 11/1982 | Kikuchi et al. | ........... | 271/288 |
| 4,437,660 A * | 3/1984 | Tompkins et al. | ........... | 271/290 |
| 4,501,419 A * | 2/1985 | Takahashi et al. | ........... | 271/288 |
| 4,965,629 A * | 10/1990 | Hiroi et al. | ........... | 355/50 |
| 5,204,728 A * | 4/1993 | Braswell | ........... | 399/75 |
| 5,435,544 A * | 7/1995 | Mandel | ........... | 271/298 |
| 5,563,999 A | 10/1996 | Yaksich et al. | | |
| 5,599,009 A | 2/1997 | Mandel et al. | | |
| RE35,649 E * | 11/1997 | Baer | ........... | 194/206 |
| 6,075,617 A * | 6/2000 | Fischer et al. | ........... | 358/1.16 |
| 6,170,821 B1 * | 1/2001 | Kubota | ........... | 271/288 |
| 6,292,711 B1 | 9/2001 | LaDue | | |
| 6,322,262 B1 * | 11/2001 | Trosterud | ........... | 400/70 |
| 6,362,897 B1 * | 3/2002 | Berg et al. | ........... | 358/1.6 |
| 6,373,588 B1 * | 4/2002 | Fischer et al. | ........... | 358/1.16 |
| 6,735,498 B2 * | 5/2004 | Hertz | ........... | 700/236 |
| 2002/0196460 A1 * | 12/2002 | Parry | ........... | 358/1.15 |
| 2003/0011813 A1 * | 1/2003 | Peter et al. | ........... | 358/1.15 |
| 2003/0053122 A1 * | 3/2003 | Kinoshita | ........... | 358/1.15 |

* cited by examiner

Primary Examiner—Twyler L Haskins
Assistant Examiner—Myles D Robinson (57) ABSTRACT

A representative embodiment provides for a document printing apparatus having a print engine a print engine configured to print sheet media, and an output tray configured to receive printed sheet media from the print engine. The printing apparatus further includes a memory device, a processor, and a sheet media detector. The sheet media detector is configured to determine a predetermined quantity of sheet media in the output tray and to generate a signal in response thereto. The memory device is configured to store a document therein in electronic form. The processor is configured to receive the signal from the sheet media detector, and, in response, to cause the print engine to print the document and to place the document in the output tray.

28 Claims, 4 Drawing Sheets

PRINTING METHODS AND APPARATUS FOR PROVIDING PRINTED FORMS

BACKGROUND

In many instances it is desirable to make standardized documents available to users. Such standardized documents can include forms with fields to be completed by a user, or publications of general information. For example, in a revenue service bureau it is desirable to provide users with forms for reporting income and taxes due on the income, as well as publications explaining how the forms are to be completed, and providing other information useful to individuals or companies. Another example is in an office environment, such as a real estate office, where forms such as sales and lease agreements, closing documents, and other related information is to be made available to agents to enable them to perform their functions in completing sales or leases of real property. Yet another example is in the office of a legal services provider (such as a law firm or a public service bureau) where it is desirable to provide users with forms commonly filed with a court of law, instructions for completing the forms, and general information. As used herein, the term "document" and "documents" will mean any and all such printed matter which it is desirable to make available to a population of users.

Generally, past practice has been to print a number of the documents and place the documents in stacks or in bins so that a user can pick the document he or she desires from the stack or bin. When a stack or bin for any particular document is depleted or becomes empty, then a service provider is required to either print additional copies of the depleted documents and place them in the stack or bin, or, more commonly, to retrieve several of the documents from a document inventory and place them in the stack or bin. This, of course, requires human intervention. Personnel may not always be available to perform these duties, or may be taken away from other duties in order to replenish the depleted stack or bin.

When documents are provided from a document inventory, then an additional problem with the traditional system of providing documents to users arises. The document inventory is generated based on an assumption of the estimated number of each document that will be required by users. When the estimate of the number of documents is too low, then additional documents must be printed, or the documents will not be available to the users. When the estimate of the number of documents is too high, then excessive printing costs are incurred.

Further, documents, particularly in the way of forms and publications, are frequently updated. For example, revenue reporting related forms are updated annually to reflect the then-current reporting year. If too many forms were printed for the previous reporting period, then the surplus forms must be destroyed when the forms for the current reporting period are printed. This, of course, results in waste, and also introduces the possibility that the wrong form may be provided to users.

What is needed then is a way to provide documents to users that alleviates the problems associated with prior art methods of providing documents to users.

SUMMARY

A representative embodiment of the present invention provides for a document printing apparatus having a print engine configured to print sheet media, and a plurality of output trays configured to receive printed sheet media from the print engine. The printing apparatus further includes a memory device, a processor, and a plurality of sheet media detectors. Each sheet media detector is configured to detect the absence of sheet media in an associated output tray, and to generate a signal in response thereto. The memory device is configured to store a plurality of documents therein in electronic form. The processor is configured to receive the signals from the sheet media detectors, and, in response, to cause the print engine to print the documents stored in the memory device as printed documents, and to place the printed documents in the plurality of output trays.

These and other aspects and embodiments of the present invention will now be described in detail with reference to the accompanying drawings, wherein:

DETAILED DESCRIPTION

Embodiments of the present invention, described below, provide for methods and apparatus for automatically printing documents to be provided to one or more users of the documents. Typically, the documents will be provided to a population of users so that a user can pick the document he or she desires from an inventory of the documents and, when the inventory for a particular document has been depleted, one or more additional copies of the document will be automatically printed to replace the depleted inventory of the document. "Documents" as used herein includes documents which include fields to be completed by a user (i.e., a "form"), documents to provide information to a user (e.g., publications, periodicals, pamphlets, brochures, instruction sheets, etc.), documents for sale to customers (e.g., sheet music in a music store, and maps in a map store), and any other kind of printed matter it is desirable to be made available to one or more users.

Figure 1:
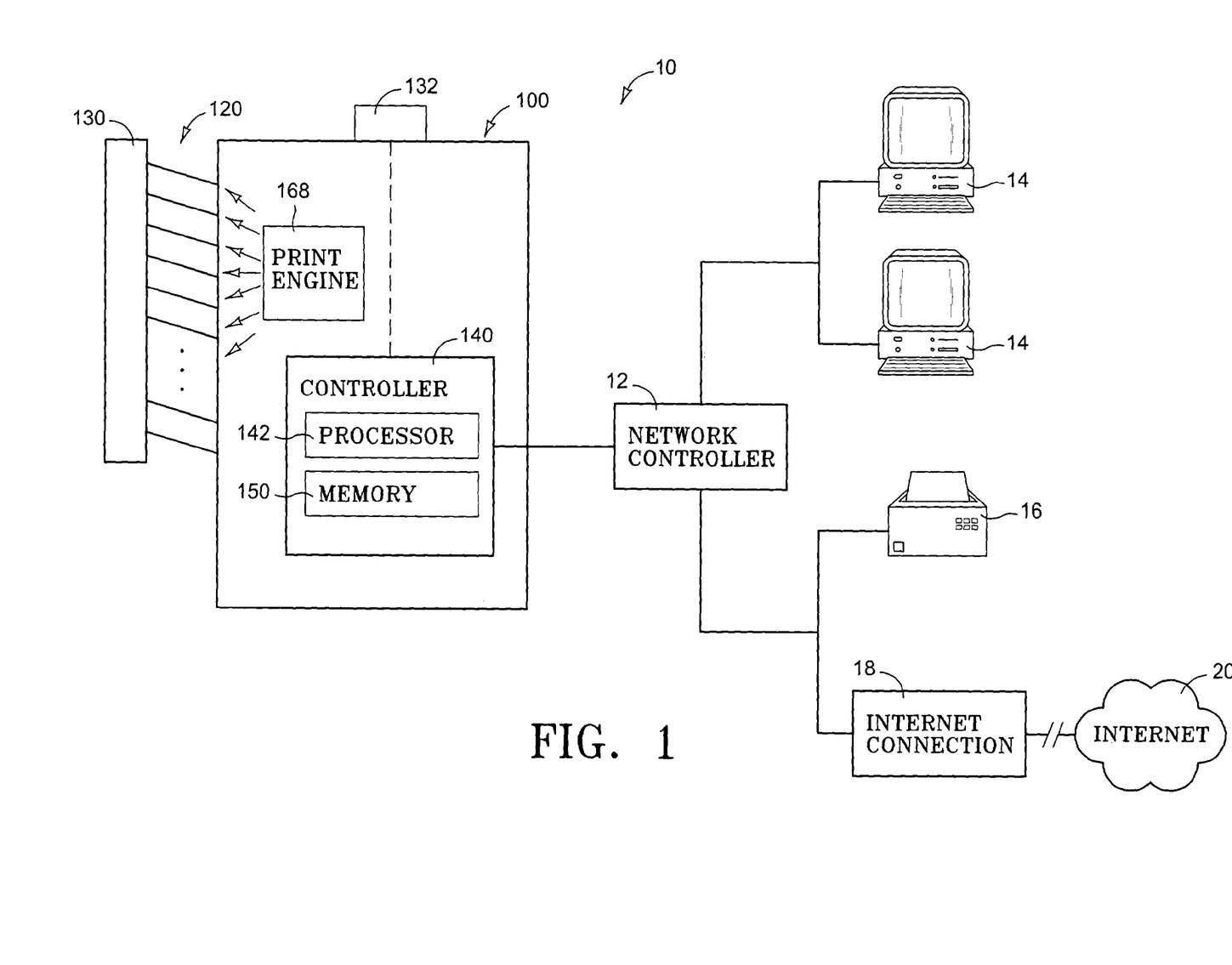
FIG. 1 is a diagram depicting a document generating system which includes a document printing apparatus in accordance with an embodiment of the present invention.

Turning to FIG. 1, a diagram depicts a document generating system 10 that includes a document printing apparatus 100 in accordance with an embodiment of the present invention. The document printing apparatus 100 is configured to print one or more predefined documents to be made available to one or more users. The document generating system 10, as depicted, further includes one or more computers 14 (such as personal computers or workstations) which are in communication with the document printing apparatus 100. As depicted in FIG. 1, the document generating system 10 includes a network controller 12 that allows the computers 14 to be placed in communication with the document printing apparatus 100. A secondary printer 16 can also be placed in communication with the network controller, such that users of the computers 14 can select to have a print job selectively printed using the secondary printer 16. A "print job" can include one or more or the predefined documents to be made available to one or more users (the "predefined documents" being intended to be automatically printed by the printing apparatus 100), or a custom document which is typically not intended to be made generally available multiple users. In addition to being in communication with the computers 14, the network controller 12 can be in communication with a global communication network, such as the Internet 20 via an Internet connection 18.

The document printing apparatus 100 includes a print engine 168 that is configured to print an electronic form of one or more of the documents which are intended to be made available to one or more users. The print engine can be, for example, an electrophotographic imaging device such as a laser printing device, or a liquid ink printing device, such as an ink jet printing device. The printing apparatus 100 further includes one or more output trays 120 configured to receive printed sheet media (which make up the document(s)) from the print engine 168. As will be described more fully below with respect to FIG. 2, each output tray 120 is provided with a sheet media detector (180, FIG. 2) which is configured to detect the absence of sheet media in an associated output tray (any of trays 120, FIG. 1) and to generate a signal in response to detecting the absence of sheet media in the output tray. The document generating system 10 further includes a processor 142 that is part of a controller 140 resident within the printing apparatus 100. Although the processor 142 is indicated in FIG. 1 as being a component of the controller 140, the processor 142 can equally be located within the network controller 12, any of the computers 14, or through a remote connection via the Internet connection 18. The document printing apparatus 100 further includes a computer readable memory device 150 that is readable by the processor 142. The memory device 150 is configured to store a plurality of documents therein in electronic form. Although the memory device 150 is indicated in FIG. 1 as being a component of the controller 140, the memory device 150 can equally be located within the network controller 12, any of the computers 14, or through a remote connection via the Internet connection 18. The processor 142 is configured to receive the signals from the sheet media detectors (180, FIG. 2) and, in response to receiving the signals, to cause the print engine 168 (FIG. 1) to print the documents stored in the memory device 150 as printed documents, and to place the printed documents in one or more of the output trays 120.

The computer(s) 14 allow a user to edit any of the documents stored in the memory device 150, and also allow a user to create a new document to be stored in the memory device 150. Further, the computer(s) 14 allow a user to transmit a custom document in electronic form to the printing apparatus 100 via the network controller 12 (or via the Internet connection 18), and to cause the printing apparatus 100 to print the custom document as a printed custom document. The "custom document" can be a document that is not intended to be automatically generated by the printing apparatus 100 and inventoried in one of the output trays 120. For example, a "custom document" can be a personal letter. The printing apparatus 100 can be configured to place the printed custom document in a selected one of the plurality of output trays 120. That is, one of the output trays 120 can be designated specifically for receiving printed custom documents, as will be described more fully below.

Figure 2:
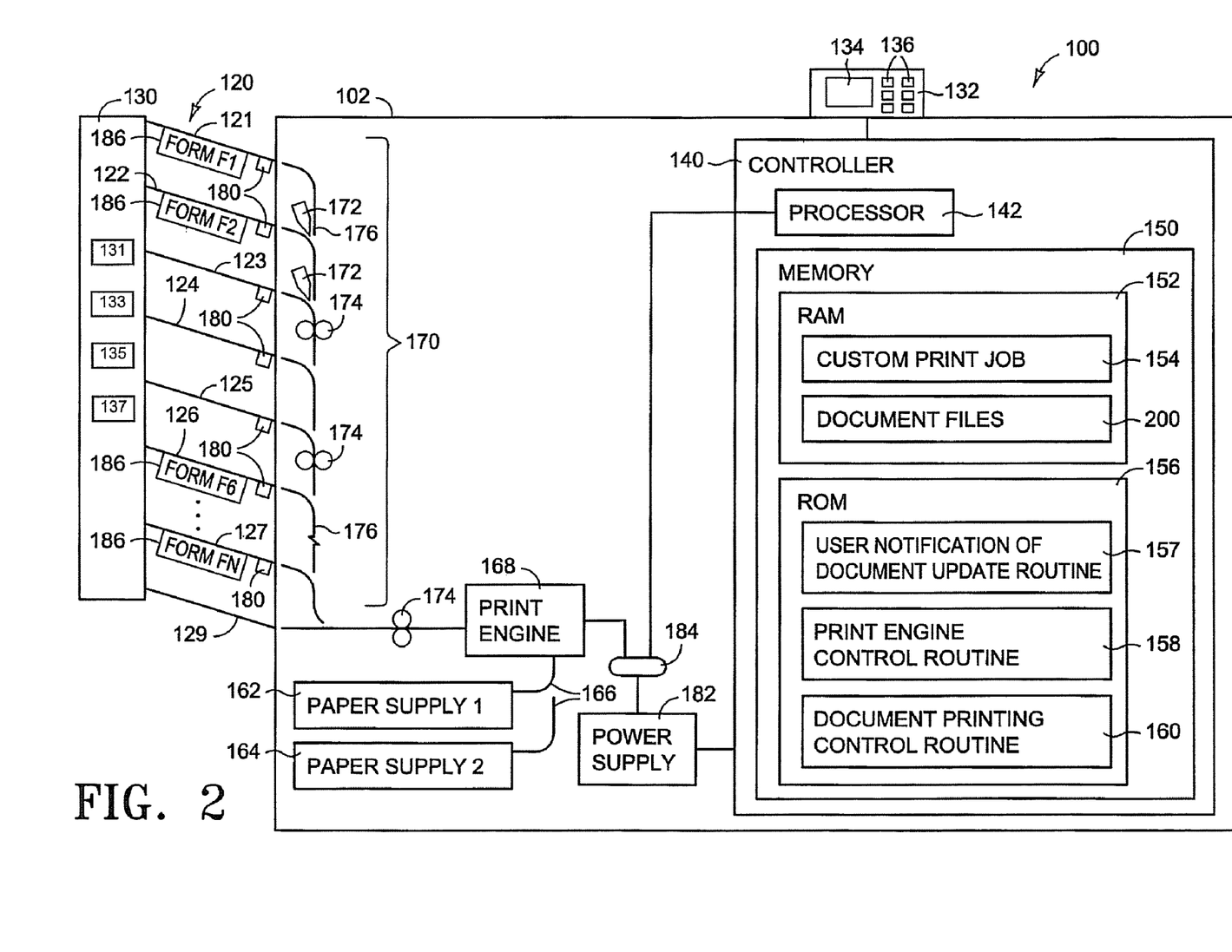
FIG. 2 is a side elevation diagram depicting details of a document printing apparatus in accordance with an embodiment of the present invention.

Turning to FIG. 2, a side elevation diagram depicts details of the document printing apparatus 100 of FIG. 1. It will be understood that the document printing apparatus 100 of FIG. 2 can be used in the document generating system 10 depicted in FIG. 1, or it can be operated as a stand-alone printing apparatus, as depicted in FIG. 2. The document printing apparatus 100 of FIG. 2 includes a housing 102 and a print engine 168 which can receive sheet media from sheet media feed trays 162 and 164 (indicated respectively as "Paper Supply 1" and "Paper Supply 2") via media feed guides 166. Although sheet media feed trays 162 and 164 are labeled as "paper" supply trays, it will be understood that non-paper media (such as plastic transparencies, for example) can be used as the sheet media contained in the trays 162 and 164. Further, although the document printing apparatus 100 is indicated in FIG. 2 as including two sheet media trays 162 and 164, only one single sheet media tray can be provided, or more than two sheet media trays can be provided. The print engine 168 is configured to print an image (such as text and/or graphics) on the sheet media and to discharge the printed sheet media to a document distribution device 170, which in turn places the printed sheet media in selected ones of the plurality of output trays 120.

The document distribution device 170 includes sheet media guides 176 and feed rollers 174. The feed rollers 174 move the printed sheet media along the media guides 176 to the appropriate one of the output trays 120. A series of diverter gates 172 (only two of which are shown) selectively divert printed sheet media from the sheet guides 176 and into the appropriate output trays 120. The diverter gates 172 can be selectively controlled by the controller 140, as will be more fully described below.

The output trays 120 are depicted as including a first output tray 121, a second output tray 122, and so on for third, fourth, fifth, sixth, and "$n^{th}$" output trays 123 through 127, respectively. Output trays 120 are configured to receive automatically printed documents, as will be described further below. Each of the output trays 120 (i.e., trays 121 through 127) can be provided with indicia 186 to identify the printed document placed in the tray. For example, tray 121 is intended to receive printed copies of "Form F1", tray 122 is intended to receive printed copies of "Form F2", tray 126 is intended to receive printed copies of "Form F6", and tray 127 is intended to receive printed copies of "Form FN". For simplicity, only trays 121, 122, 126 and 127 are shown as bearing the indicia 186. Although FIG. 2 depicts the document printing apparatus 100 as having seven output trays 121 through 127, the printing apparatus 100 can have as few as one output tray, or as many output trays as are desired. The printing apparatus 100 can be further provided with a printed custom document output tray 129 that can receive a custom print job (i.e., a "printed custom document", described above with respect to FIG. 1). The printed custom document output tray 129 can be reserved for only printed custom documents, or it can also be used to store printed documents that are automatically printed by the printing apparatus 100.

Each of the output trays 120 (i.e., trays 121 through 127, and excluding custom document tray 129) can be provided with a sheet media detector 180 configured to detect the absence of sheet media in the output tray, and to generate a signal in response to the absence of sheet media in the tray. It will be appreciated that the "signal" can either be an active signal (such as an electrical current), or a passive signal (such as the absence of a previously established electrical current). While the presence of the signal (actively or passively) indicates the absence of sheet media in an associated output tray 120, by like token the absence of the signal indicates the presence of sheet media in the associated output tray. Accordingly, it will be appreciated that the statement "the sheet media detector 180 is configured to detect the absence of sheet media in the output tray" also includes the fact that the sheet media detector 180 can detect the presence of sheet media in the output trays 120. That is, if the absence of sheet media in the tray is not determined or detected, then this indicates the presence of sheet media in the output tray.

The document printing apparatus 100 can be provided with a finishing device (or "finishing unit") 130 which can be configured to apply one or more post-printing finishing processes to the printed documents placed in the plurality of output trays 120 and 129. For example, the finishing device 130 can be configured to provide the post-printing finishing process as a stapling process, illustrated schematically as 131, a sheet folding process, illustrated schematically as 133, a hole punching process, illustrated schematically as 135, and/or a sheet binding process, illustrated schematically as 137. That is, the finishing device 130 can apply one or more finishing processes to sheets of documents placed in the output trays 120, to thereby generate the final printed document. The application of the post-printing finishing process or processes to the printed sheets placed in the plurality of output trays 120 can be performed under the direction of the controller 140 (as described more fully below). Moreover, the controller 140 can be configured to cause the finishing device 130 to selectively apply the post-printing finishing process (or processes) to printed sheets placed in the plurality of output trays 120. For example, the controller 140 can be configured to cause the finishing device 130 to staple sheets placed in tray 121, to fold and hole-punch sheets placed in tray 122, to perform no finishing process on sheets placed in tray 123, and to bind sheets placed in tray 124. Likewise, for example, the controller 140 can be configured to cause the finishing device 130 to staple sheets placed in trays 122, 125 and 126, and not to perform any stapling or other finishing on sheets placed in the remaining trays.

The document printing apparatus 100 further includes the controller 140, which in turn includes a processor 142 and a computer readable memory device 150. The processor 142 can be a microprocessor or a computer, as well as an assembly of state circuits (such as AND, OR, and NOR gates etc., as well as transistors, diodes, etc.). The memory device 150 can be a semiconductor memory device, an optical memory device, a magnetic memory device, or any other computer readable memory device, and combinations thereof. The memory device 150 can include a random access memory ("RAM") portion 152 and a read only memory ("ROM") portion 156, as well as variations thereof (DRAM, SRAM, etc.). The printing apparatus 100 can be provided with a power supply, such as electrical power supply 182, which can be selectively controlled by the controller 140. A power distribution circuit 184 can be provided to allow the controller 140 to selectively apply power to the print engine 168, the diverter gates 172, the powered rollers 174, the finishing unit 130, and other electrically powered devices which make up the printing apparatus 100.

Electronic copies of the document files 200 can be stored in the memory device 150 (shown here as being stored in the RAM memory portion 152, but which can also be stored in the ROM memory portion 156), and can be printed by the document printing apparatus 100 and placed in the output trays 120. More specifically, and as will be described in more detail below, the processor 142 can be configured to receive the signals from the sheet media detectors 180, and, in response, to cause the print engine 168 to print one or more of the document files 200 and to selectively place the printed documents in one or more of the output trays 120. For example, if the sheet media detector 180 associated with output tray 121 detects that there are no sheets of media in output tray 121 (indicating that the last copy of "Form F1" has been removed from tray 121), then the processor 142 will read the electronic copy of form "Form F1" from the document files 200, and will cause the print engine 168 to print the document "Form F1", and then will cause the document distribution system 170 to place the printed version of document "Form F1" in output tray 121.

It will be appreciated that the "Document File" 200 of FIG. 2 can equally be a pointer to a true document file at a remote location. For example, the location of the "true" (i.e., full and most recent version) of a document can reside on the network controller (12, FIG. 1), one of the computers 14, or the Internet 20. Accordingly, the "document files" 200 of FIG. 2 can include not only files corresponding to full documents, but pointers to remote locations of full documents. Further, when a full document is retrieved from a remote location (e.g., the network controller (12, FIG. 1), one of the computers 14, or the Internet 20), then the "document files" RAM memory location 200 can temporarily contain one or more pages of the full document from such remote location, allowing the print engine 168 to format (and print) only so many pages of the full document as can be temporarily stored in the memory space allocated in the "document files" RAM memory location 200. For example, if the "document files" RAM memory location 200 is only allocated 5 megabytes, yet a full document (stored in a remote location) to be printed by the print engine 168 is a 20 megabytes file, then the "document files" RAM memory location 200 will act as a dynamic RAM memory location, receiving only as many pages of the full document from the remote location as can currently be stored in the allocated memory space. Once the pages of the full document stored in the "document files" RAM memory location 200 have been printed, then those pages will be overwritten with the next pages to be printed. Accordingly, the expression "document files" as used herein with respect to item 200 of FIG. 2 includes not only complete (i.e., "full") files of documents, but also pointers to remoter locations of such full document files, and temporary storage of portions of such remote full document files.

The memory device 150 (FIG. 2) can also include a reserved memory location 154 for custom print jobs (i.e., "custom documents", described above), to allow a user to direct the printing apparatus 100 to print the custom print job, which can then be placed in the reserved custom print job output tray 129 by the document distribution device 170, all under control of the controller 140. The memory device 150 can also include a print engine control routine 158 that governs the process of generating images on sheets of sheet media from the electronic document files 200. Further, the memory device 150 can be provided with a document printing control routine 160 which is executable by the processor 142 to allow one or more of the document files 200 to be automatically produced as a printed document, and to cause the document distribution device 170 to place the printed document in the appropriate output tray (from among trays 121 through 127), as will be described more fully below.

The document printing apparatus 100 can also be provided with a user interface 132, which can include a display 134 and user input points (buttons or switches) 136. The user interface 132 can be used, for example, to allow a user to print a custom print job, and to allow a user to edit the document printing control routine 160, as well as the document files 200. While the user interface 132 is indicated in FIG. 2 as being a module which is a part of the document printing apparatus 100, the user interface 132 can also be provided in the way of one or more of the computers 14 of FIG. 1. Further, while FIG. 2 depicts the controller 140 and its constituent components as being resident within the housing 102 of the printing apparatus 100, it will be appreciated that the controller 140, and/or components thereof (such as the processor 142 and/or the memory device 150, or portions thereof, can be located outside of the housing, as for example by being located in one or more of the computers 14 of FIG. 1.

Figure 3:
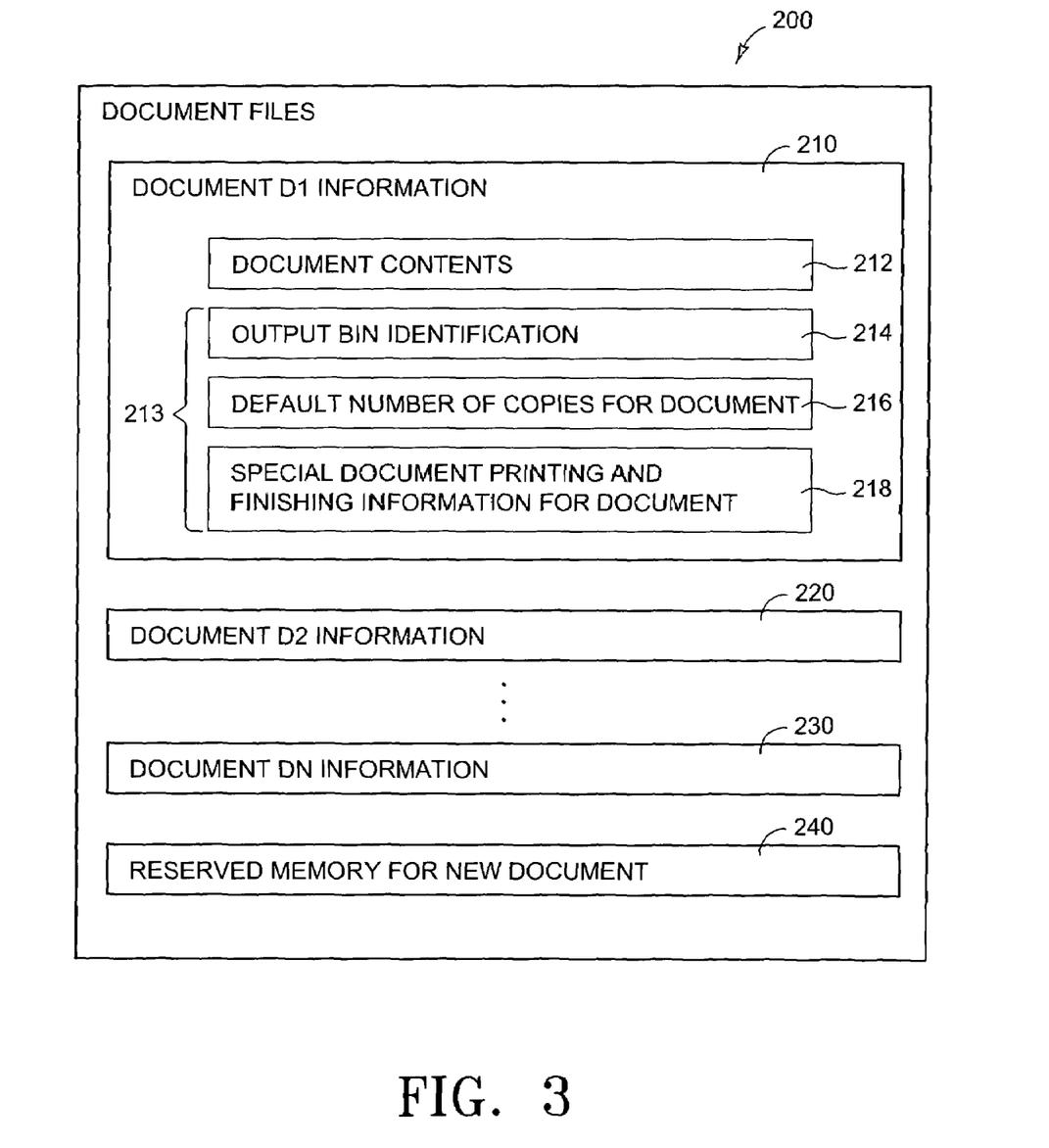
FIG. 3 is a block diagram depicting an example of how electronic document files can be stored in a computer readable memory to be accessed for printing by the document printing apparatus of FIG. 2.

Turning now to FIG. 3, a diagram depicts one example of the electronic document files 200 of FIG. 2. As depicted in FIG. 3, the document files 200 include document information 210, 220 and 230 for respective documents "D1", "D2" and "DN" (document "DN" being the last of a series of documents). It will be understood that the documents file 200 can include one or more documents, but does not necessarily need to include a plurality of documents. The document file 200 can further include a reserved memory space 240 for new documents (i.e., documents beyond document "DN").

For the purposes of simplification of the diagram shown in FIG. 3, details of the information that can make up any one of the document information sets 210, 220, 230 are depicted only for document information set 210, which corresponds to document "D1", although it will be appreciated that similar details for document information sets 220 and 230 can be provided. As depicted, document information set 210 includes the document contents 212, which can include the text and/or images to be generated on sheet media that make up the final printed document. The document information set 210 can further include additional or "special" document information 213, such as the identification 214 of the output tray (from among trays 121 through 127 of FIG. 2, for example) where the printed copy or copies of the document "D1" are to be placed after being printed, the default number of copies (216, FIG. 3, for example) of the document "D1" to be printed when the associated output tray is determined to be empty (as determined by the sheet media detector 180 of FIG. 2), and special document printing and finishing information 218 for the document "D1". Examples of the special document printing and finishing information 218 include the size of sheet media to be used, the type of sheet media to be used, the layout of the printed document on the sheet media (e.g., portrait or landscape format), the finishing process or processes to be applied (if any) to sheets of the printed document, and whether the sheet media is to be printed in simplex (i.e., one-sided) or duplex (i.e., two-sided) format.

It will be appreciated that special document printing and finishing information 218 for any given document can specify that the document includes a variety of different printing instructions. For example, for a document that is a brochure, the printing information 218 can specify that the first and last pages of the document (corresponding to a front and back cover sheet for the document) are to be printed on heavier stock than the other pages of the document, and that certain pages of the document are to be printed in landscape format, while other pages are to be printed in portrait format. Further, in this example, the special printing information 218 can specify that nothing is to be printed on the last page of the document (i.e., on the back cover of the brochure).

As will be appreciated from FIG. 3, each document "D1", "D2" and "DN" which is stored in electronic form in the memory device 150 (FIG. 2) can have a predetermined one of the plurality of output trays (from trays 121 through 127, FIG. 2) associated with the respective document, such that copies of each document will be placed in an output tray specifically reserved for that particular document. However, the processor 142 can be configured to allow a user to edit the document file 200 (e.g., via the user display 132 of FIG. 2, or via one of the computers 14 of FIG. 1) to change the location of the designated output tray for each of the documents "D1", "D2", "DN". Further, for any selected sheet media detector 180 (FIG. 2), and in response to receiving a signal from the selected sheet media detector, the processor 142 can be configured to cause the print engine 168 to print a predetermined number of copies of the document (as established by the default number of copies in memory location 216, FIG. 3, for example) associated with the output tray which is in turn associated with the selected sheet media detector. For example, if the default number of copies of document "D1" of FIG. 3 is set as "10" in the memory location 216, then when the sheet media detector 180 (FIG. 2) associated with output tray 121 determines that the tray is empty, the processor 142 (FIG. 2) will cause the print engine 168 to print ten copies of document "D1". Further, the processor 142 will cause the document distribution system 170 (FIG. 2) to place the ten copies of document "D1" (FIG. 3, and corresponding to "Form F1" of FIG. 2) in output tray 121. Likewise, if the default number of copies of document "D2" of FIG. 3 is set as "5" in a memory location for document information 220, then when the sheet media detector 180 associated with output tray 122 determines that the tray is empty, the processor 142 (FIG. 2) will cause the print engine 168 to print five copies of document "D2", and place the copies in output tray 122.

As indicated earlier, the user interface 132 of the document printing apparatus 100 of FIG. 2 can be used to allow a user to print custom documents using the printing apparatus 100. Further, the user interface 132 (through the controller 140) can be configured to allow a user to cause the print engine 168 to print at least one of the documents stored in the document file 200 in the absence of a signal from any of the sheet media detectors 180. That is, a user may desire to have ten copies of a specific document available for immediate use. In this instance, the output tray (from trays 121 through 127 of FIG. 2) designated for holding the printed copies of the specific document may not yet be empty, or may contain less than ten copies of the document. The user can then either remove any remaining copies of the document in the tray and allow the processor 142 to automatically generate replacement copies (in the manner described above), or the user can instruct the processor 142 (via the user interface 132) to print ten copies of the document and place them in the designated output tray. Alternately, the user can instruct the processor 142 to place the ten copies of the specific document in the custom print job tray 129. In another variation, the processor 142 (via the document printing control routine 160) can be configured to automatically print copies of the documents from the document files 200 only when a user authorizes printing via the user interface 132. For example, when a particular output tray 121 through 127 becomes empty, the sheet media detector 180 will signal the processor 142 to print a replacement copy (or copies) of the document. However, before printing the document, the processor 142 will query a user (via the user display 134) whether the copies should be printed or not. This provides a user the opportunity to cancel the print job, or to modify the print job (for example, by editing the number of copies of the document to be printed, as set in memory location 216 of FIG. 3, for example).

In one variation, the sensors 180 of FIG. 2 can be level detection sensors configured to determine when the number of copies of a document in any one of the output trays 120 has been depleted to, or fallen below, a predetermined level. The predetermined level can be established for each output tray 121 through 127, and can be set for each output tray to correspond generally to a specific number of copies of a printed document in the designated tray. Accordingly, when a level detection sensor 180 detects that the level of documents in any given output tray 120 has reached or fallen below the predetermined level corresponding to the level set for the sensor, then the processor 142 will cause the default number of copies (216, FIG. 3) to be printed and placed in the given output tray. For example, for a document that is frequently consumed in multiples at a time, it can be convenient for a predetermined number of copies of the document to always be available to users. In this way, a user will not be required to wait while copies of the document are generated once the output tray has become depleted. Further, for any given output tray (from trays 121 through 127) the "predetermined level" can be set at zero, such that the given tray must become depleted or empty before the default number of copies (216, FIG. 3) are printed and placed in the tray. Accordingly, the sensors 180 can be generically described as "sheet media detectors" configured to determine or detect a predetermined quantity (either zero of a quantity greater than zero) of sheet media in each of the output trays 120, and to generate a signal in response thereto. That is, if a quantity greater than the predetermined quantity is present in the output tray, then no signal will be generated.

ROM memory 156 in controller 140 can further include a "User Notification of Document Update Routine" 157(FIG. 3) that is configured to determine when a Document File 200 has been updated. When the User Notification Routine 157 determines that a document file 200 has been updated, then the processor 142 can notify a user (via terminal 14 of FIG. 1, for example) that the document has been updated, and that any copies of the document residing in the associated output tray (from trays 121 through 127) should be removed and destroyed. The notification presented to the user can take the form of a message, such as: "The document for tray 124 has been updated. Please remove any existing copies of this document from tray 124." Printing of the revised document can be withheld by processor 142 (FIG. 2) until the sensor 180 for the given tray 120 indicates that "obsolete" copies of the document have been removed form the given tray. Upon removing the now-obsolete copies of the document from the indicated tray, new replacement copies will be automatically generated, in the manner described above. Further, the notification to the user can include an interactive interface allowing the user to cancel the notification such that the "obsolete" copies do not have to be removed before "new" copies of the document are printed (e.g., if the amendment to the document is merely cosmetic).

Figure 4:
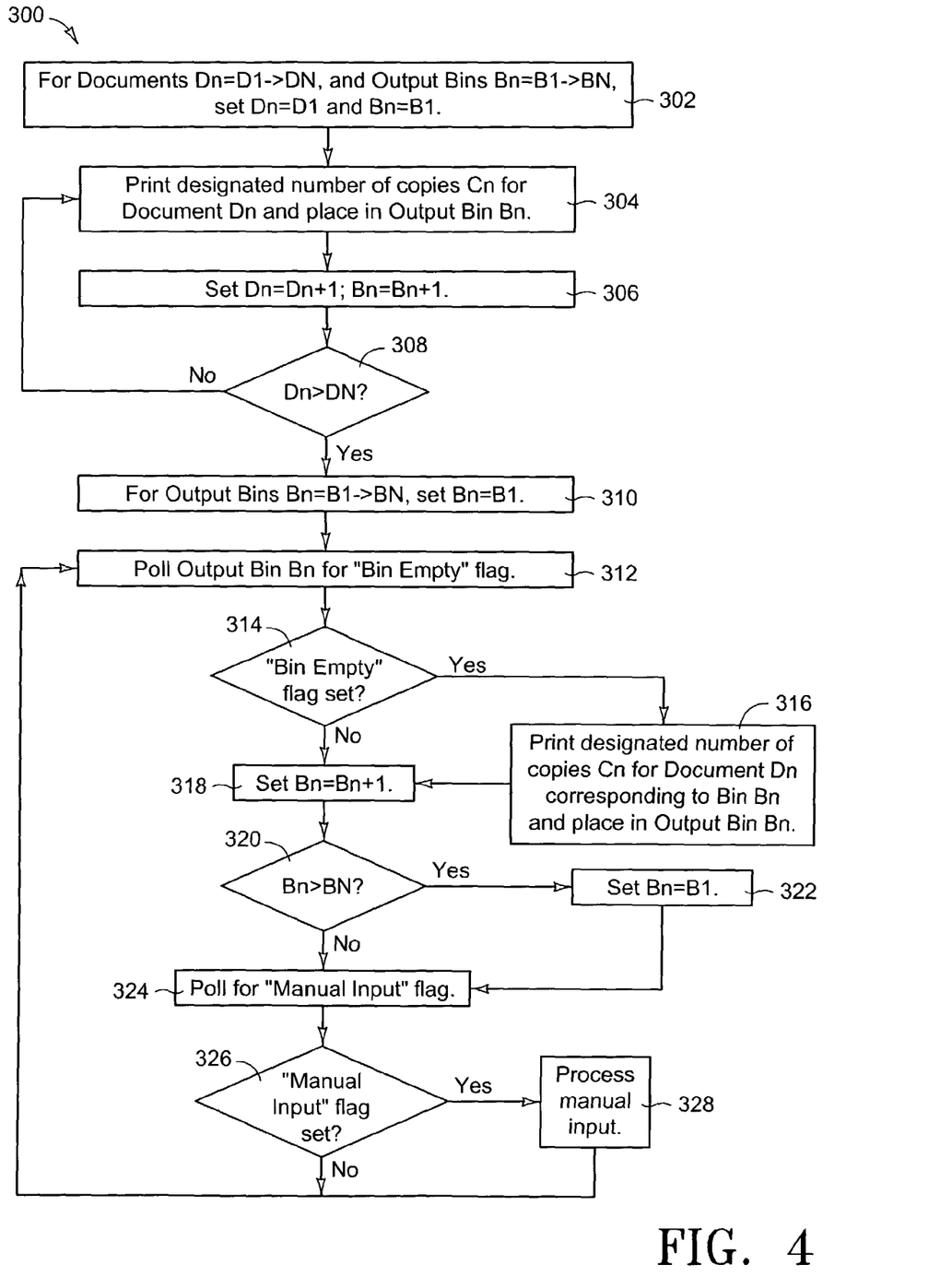
FIG. 4 is a flowchart depicting a method of printing documents in accordance with an embodiment of the present invention.

Turning now to FIG. 4, a flowchart 300 depicts one example of how the document printing control routine 160 of FIG. 2 can be configured. The flowchart 300 of FIG. 4 will be discussed with reference to the document printing apparatus 100 of FIG. 2 in order to facilitate understanding of the flowchart, but it will be understood that the flowchart 300 can be used with other imaging apparatus configured for the intended purpose. The flowchart 300 is configured for a "two-part" process, as follows. In the first part of the process, covered by steps 302 through 308 of the flowchart 300, it is assumed that all of the output trays (e.g., trays 120, FIG. 2) are initially empty. Accordingly, the trays are first filled with an initial set of the documents. Thereafter, in the second part of the process, covered by steps 310 through 328 (FIG. 4), the output trays (120, FIG. 2, for example) are monitored. If a tray (121 through 127, for example) is detected as being empty, then one or more copies of the document associated with that tray are automatically printed and placed in the tray.

With reference to FIG. 4, at step 302 the processor (142, FIG. 2) sets a document counter ("Dn") and an output bin counter ("Bn") equal to "D1" and "B1", respectively. The document counter ("Dn") and the bin counter ("Bn") can be established in the RAM memory device 152. The output bins "B1" through "BN" can correspond to output trays 121 through 127 (FIG. 2), and the documents "D1" through "DN" can correspond to documents "D1" through "DN" of FIG. 3.

At step 304 (FIG. 4) of the flowchart 300 the number of copies for the document currently identified by the document counter ("Dn") are printed and are placed in the output bin currently identified by the bin counter (i.e., "Bn"). The number of copies ("Cn") of the document to be printed can be set in the document information set, such as indicated by block 216 of FIG. 3. At step 306 (FIG. 4) the document counter and the bin counter are incremented by a value of "1". At step 308 a check is made to determine whether the value currently stored in the document counter exceeds the value "N" (a value exceeding "N" indicating that the last document, "DN", has been printed). If the last document ("DN") has not been printed, then control returns to step 304 so that the copies of the then-identified document ("Dn") can be printed and placed in the corresponding output bin ("Bn").

If at step 308 it is determined that the copies of the last document ("DN") have been printed and placed in the associated output bin ("BN"), then control moves to step 310, and the bin counter ("Bn") is reset to identify the first output bin, "B1". At step 312 the output bin ("Bn") currently identified by the bin counter is polled to determine if a "bin empty" flag is set. This can be accomplished by using the sheet media detector 180 of FIG. 2, which can be polled by the processor 142. If the detector 180 indicates that an associated bin (e.g., output tray 121) is empty, then the processor 142 can set a flag in a memory location (equivalent to changing binary states of a memory location which can be established in RAM memory device 152) to indicate that the associated output tray (or "bin") is empty. If at step 314 (FIG. 4) it is determined that the "bin empty" flag is set for the bin currently identified by the bin counter, then at step 316 the designated number of copies ("Cn") of the document to be printed to the identified bin "Bn" are printed, and the copies placed in the output bin. As indicated earlier, the number of copies "Cn" to be printed for any given document can be stored in the memory device (150, FIG. 2) as part of the document information set (e.g., information set 210 of FIG. 3).

Further, the document files (200, FIGS. 2 and 3) can act as a document map to identify the document which is associated with any given output bin. For example, the bin identification 214 for document "D1" (FIG. 3), and corresponding bin identifications for documents "D2" through "DN", can be read by the processor 142 (FIG. 2) to identify a match between one of these bins and the output bin currently identified by the bin counter. Once a match is found, it will be established which document is associated with that output bin, and the document can be printed and placed in the output bin. For example, if the bin currently identified by the bin counter is bin "B2", and the processor 142 (FIG. 2) views the document information 220 (FIG. 3) for document "D2", the processor will find a match between bin "B2" and document "D2". The processor 142 (FIG. 2) will then determine that document "D2" should be printed to the detected bin "B2", assuming the detector 180 (FIG. 2) associated with bin "B2" (output tray 122, for example) determines that bin "B2" is empty.

If at step 314 of the flowchart 300 (FIG. 4) it is determined that the bin currently identified by the bin counter ("Bn") is not empty (i.e., no "bin empty" flag is set), then at step 318 the bin counter is incremented by the value of "1", and at step 320 a check is made to determine whether the value in the bin counter now exceeds the last possible bin (bin "BN"). If the bin counter exceeds "N" (for bin "BN"), this indicates that all bins have been polled for a "bin empty" condition, and at step 322 the bin counter is reset to identify the first bin "B1" so that the polling process can begin anew to poll bins "B1" through "BN" for a "bin empty" condition. Thereafter, the processor (142, FIG. 2) can check at step 324 (FIG. 4) for a "manual input flag".

Step 324 is reached directly from step 320 if at step 320 it is determined that the value in the bin counter does not indicate that all bins "B1" through "BN" have been polled. The "manual input" flag indicated at step 324 can be set, for example, via the user interface (132, FIG. 2) or via one of the computers (14, FIG. 1). An example of a condition which would cause the "manual input" flag to be set is where a user desires to print a custom print job using the document printing apparatus (100, FIGS. 1 or 2, for example), or where a user desires to print one or more copies of a particular document stored in the document file (200, FIGS. 2 and 3), or where a user desires to edit the document information set (e.g., 210, FIG. 3) for one or more of the documents in the document file 200. If at step 326 (FIG. 4) it is determined that the "manual input" flag is set, then at step 328 the manual input is processed (e.g., a custom document is printed), and the processor (142, FIG. 2) then resumes with polling the output bins for a "bin empty" condition at step 312 (FIG. 4). However, If at step 326 it is determined that no "manual input" flag is set, then the processor (142, FIG. 2) resumes directly with polling the output bins for a "bin empty" condition at step 312 (FIG. 4).

It will be appreciated that the flowchart 300 of FIG. 4 is exemplary only, and that fewer, additional, or different steps can be used, all within the scope of the present invention. For example, steps 302 through 308 (corresponding to the first part of the "two-part process" described above) can be eliminated. In this event, the output bins (e.g., output trays 120, FIG. 2) are not initially filled with printed documents, but instead are filled as the processor (142, FIG. 2) moves through steps 310 through 328 (FIG. 4), determining each bin to be empty, and filling them accordingly with printed copies of the respective documents. Likewise, steps 324, 326 and 328 of the flowchart 300 can be eliminated where the document printing apparatus (100, FIG. 2) is not intended to accommodate non-automatic printing or editing of the document files 200 (FIG. 3). Further, in addition to the "flags" indicated at steps 314 and 324, additional flag checking steps can be provided to check for other types of flags. For example, flags (essentially memory locations) can be established for checking the inventory of sheet media in the sheet media supply trays (162, 164, FIG. 2), for detecting low levels of imaging media (e.g., ink or toner) in the print engine 168, or for detecting low levels or depletion of staples in a finishing unit (e.g., 130, FIG. 2). Additionally, when a finishing unit (130, FIG. 2) is provided, the "printing" steps 304 and 316 (FIG. 4) can include steps for checking to determine if any post-imaging finishing is to be applied to the printed copies of the document currently being printed, and for directing the finishing unit to apply the finishing process or processes to the copies as (or after) they are printed.

In another variation on the flowchart 300 of FIG. 4, if one or more of the sensors 180 (FIG. 2) is a "level detection" sensor (versus a "bin empty" sensor), then at step 312 (FIG. 4) the appropriate query is, "Poll Output Bin Bn for 'Replenishment level reached' flag.", and step 314 is, "'Replenishment level reached' flag set?" As indicated above, for Bins of B1 through BN (corresponding to output trays 121 through 127 of FIG. 2), the sensor 180 (FIG. 2) can optionally be a "level detection" sensor, or a "bin empty" sensor.

A further embodiment of the present invention provides for a control system for a document printing apparatus. The document printing apparatus can resemble the document printing apparatus 100 of FIG. 2, in that it includes a print engine (168) configured to print sheet media, a plurality of output trays (120) configured to receive the printed sheet media from the print engine, and a plurality of sheet media detectors (180). As described above, each sheet media detector 180 is configured to detect a predetermined quantity of sheet media in an associated output tray and generate a signal in response thereto. The control system includes a processor (e.g., processor 142) and a computer readable memory device (e.g., memory device 150) which is readable by the processor. The computer readable memory device (e.g., 150) contains therein a series of computer executable steps (such as the Print Engine Control Routine 158 and the Document Printing Control Routine 160) which can be executed by the processor (142) to cause the processor to receive the signals from the sheet media detectors (180) and, in response to receiving the signals, to cause the print engine (168) to print documents and place the documents in those output trays (120) associated with sheet media detectors (180) that generated the signals.

Yet another embodiment of the present invention provides for a method of automatically printing one or more documents, such as the documents stored in the document file 200 of FIGS. 2 and 3. The method includes providing one or more output trays (e.g., any or all of trays 121 through 127, FIG. 2) which are configured to receive a printed copy (or copies) of the document(s). When two or more documents are available for printing, then a separate output tray can be provided for each document. For example, document "D1" (FIG. 3) can be printed to tray 121 (FIG. 2), document "D2" (FIG. 3) printed to tray 122 (FIG. 2), and document "DN" (FIG. 3) can be printed to tray 127 (FIG. 2). The method further includes automatically checking each output tray to determine if any sheet media is present in the output tray. This can be done, for example by using the sheet media detectors 180 (FIG. 2), described above. If no sheet media is present in an output tray, the document associated with the output tray is automatically printed, and the printed copy of the document is placed in the corresponding output tray.

One example of how this can be accomplished was described above with respect to the flowchart 300 of FIG. 4, which provides an example of the document printing and control routine (160, FIG. 2) that that can be executed by the processor 142 to cause the print engine 168 to print the document. The document distribution system 170, under control of the processor 142, can then cause the printed copies of the document to be routed to, and placed in, the appropriate output bin (from among bins 121 through 127).

The method can further include automatically printing a pre-selected number of copies of the document and placing the printed copies of the document in the output tray when it has been determined that no sheet media is present in the output tray. That is, rather than printing only a single copy of the document, a pre-selected number of copies (greater than one) of the document can be printed. As indicated earlier the pre-selected number of copies of any given document to be printed can be established as part of "special document information" (e.g., 213, FIG. 3, and specifically the default number of copy information 216) that can be stored in a memory device (e.g., 150, FIG. 2). The method can further include providing a finishing device (such as finishing unit 130, FIG. 2) that is configured to provide post printing finishing to printed sheets of media. As described above, the post imaging finishing can be any process such as a stapling process, a hole punching process, a sheet folding process, etc., and combinations thereof. The finishing device can then be used to automatically and selectively apply post printing finishing to printed copies of the documents placed in the output trays (e.g., trays 120, FIG. 2). As described above, the selective application of the finishing process or processes to printed copies of the document(s) can be set forth in the "special document information" (218, FIG. 3). The expression "selective application of the finishing process (or processes)" can mean that the finishing process is applied to documents placed only in certain output trays, or that different finishing processes are applied to documents in different output trays. For example, "selective application" of a stapling process can mean that the stapling process is performed only on documents placed in certain designated output trays. Likewise, "selective application" of a stapling process and a hole punching process can mean that the stapling process is performed only on documents placed in certain designated output trays, the hole punching process is performed only on documents placed in other designated output trays, both the hole punching and the stapling process is performed on documents in yet other designated trays, and/or no process (stapling or hole punching) is performed on documents in further designated trays.

We claim:

1. A document printing apparatus, comprising:
   a print engine to print a designated number of copies of a document;
   an output tray to receive the copies of the document from the print engine;
   a sheet media detector to detect the copies of the document in the output tray and generate a signal in response to detecting a predetermined number of copies of the document in the output tray, wherein the predetermined number of copies is less than the designated number of copies;
   a memory device to store the document; and
   a processor to receive the signal from the sheet media detector and, in response to receiving the signal and without user instruction, cause the print engine to automatically print an additional number of copies of the document and place the additional number of copies of the document in the output tray to reestablish the designated number of copies of the document in the output tray.

2. The document printing apparatus of claim 1, and wherein the output tray is a first output tray, the apparatus further comprising:
   a second output tray; and
   a user interface to allow a user to direct the print engine to print a custom print job and place the print job in the second output tray.

3. The document printing apparatus of claim 1, and further comprising a housing, and wherein the housing supports the output tray, and the print engine and a controller including the processor and the memory are resident within the housing.

4. The document printing apparatus of claim 1, and further comprising a housing, and wherein the housing supports the output tray, the print engine is resident within the housing, and a controller including the processor and the memory is resident outside of the housing.

5. The document printing apparatus of claim 1, and wherein the predetermined number of copies is zero.

6. The document printing apparatus of claim 1, and wherein the predetermined number of copies is greater than zero.

7. The document printing apparatus of claim 1, and wherein the processor automatically maintains at least a predetermined quantity of the number of copies of the document in the output tray.

8. A document printing apparatus, comprising:
   a print engine to print sheet media;
   a plurality of output trays to receive the printed sheet media from the print engine;
   a plurality of sheet media detectors to detect a quantity of the printed sheet media in an associated output tray and generate a signal in response to detecting that the quantity of the printed sheet media in the associated output tray has been depleted from an initial quantity to a depleted quantity, wherein the initial quantity is greater than the depleted quantity;
   a memory device to store a plurality of documents therein in electronic form; and
   a processor to receive the signal from the sheet media detectors and, in response to receiving the signal and without human intervention, cause the print engine to automatically print the documents stored in the memory device as the printed sheet media and place the printed documents in the associated output tray to replace the depleted printed sheet media.

9. The document printing apparatus of claim 8, and wherein:
   each document stored in the memory device in electronic form has a predetermined one of the plurality of output trays associated therewith; and
   for any selected sheet media detector, and in response to receiving the signal from the selected sheet media detector, the processor causes the print engine to print the document associated with the output tray which is associated with the selected sheet media detector and place the associated printed document in the associated output tray.

10. The document printing apparatus of claim 8, and further comprising a finishing device to finish the printed documents placed in the plurality of output trays.

11. The document printing apparatus of claim 10, and wherein the finishing device at least one of staples the printed documents, folds the printed documents, hole-punches the printed documents, and binds the printed documents.

12. The document printing apparatus of claim 8, and further comprising a finishing device providing at least two post-printing finishes to the printed documents placed in the plurality of output trays, and wherein the processor causes the finishing device to selectively apply the post-printing finishes to printed documents placed in the plurality of output trays.

13. The document printing apparatus of claim 8, and further comprising a user interface in communication with the processor to allow a user to cause the print engine to print at least one of the documents stored in the memory device in the absence of the signal from any of the sheet media detectors.

14. The document printing apparatus of claim 8, and further comprising a user interface in communication with the processor to allow a user to cause the print engine to print a custom document as a printed custom document and to place the printed custom document in a selected one of the output trays.

15. The document printing apparatus of claim 8, and wherein each document stored in the memory device in electronic form is provided with special document information comprising an identification of one of the plurality of output trays which is associated with the document, a number of copies of the document to be printed when the signal is received from the sheet media detector associated with the identified output tray, and special printing and finishing instructions for the document.

16. The document printing apparatus of claim 8, and further comprising a document distribution device to selectively place the printed documents in the plurality of output trays.

17. The document printing apparatus of claim 8, and wherein the depleted quantity is zero.

18. The document printing apparatus of claim 8, and wherein the depleted quantity is greater than zero.

19. The document printing apparatus of claim 8, and wherein the processor determines if one of the documents stored in the memory device has been modified and, if so, notifies a user to remove any copies of the document from the associated output tray.

20. The document printing apparatus of claim 8, and wherein at least one of the documents is stored in the memory device in the form of an address to a remote location where a full document is stored in electronic format, and the processor uses the address to access the full document.

21. The document printing apparatus of claim 8, and further comprising a computer to allow a user to create new documents in electronic form and store the new documents in the memory device.

22. The document printing apparatus of claim 8, and further comprising a computer to allow a user to edit the documents stored in electronic form in the memory device.

23. The document printing apparatus of claim 8, and further comprising:
 a network controller in communication with the printing apparatus; and
 a plurality of computers in communication with the network controller, and wherein each of the computers can transmit a custom document in electronic form to the printing apparatus via the network controller, and cause the printing apparatus to print the custom document as a printed custom document and place the printed custom document in a selected one of the plurality of output trays.

24. The document printing apparatus of claim 8, and wherein the processor automatically maintains at least a predetermined quantity of the printed sheet media in the associated output tray.

25. A document printing apparatus, comprising:
 means for printing copies of a document;
 means for receiving the copies of the document from the means for printing;
 means for detecting a number of the copies of the document in the means for receiving and for generating a signal in response to detecting that the number of the copies of the document has been depleted from an initial quantity to a depleted quantity, wherein the initial quantity is greater than the depleted quantity;
 means for storing the document; and
 means for receiving the signal and, in response to receiving the signal and without user instruction, causing the means for printing to automatically print additional copies of the document and place the additional copies in the means for receiving to replenish the depleted number of the copies of the document in the means for receiving.

26. The document printing apparatus of claim 25, and wherein the means for receiving comprises a plurality of output trays.

27. The document printing apparatus of claim 26, and wherein the means for detecting comprises a plurality of sheet media detectors, wherein each sheet media detector is associated with a corresponding one of the plurality of output trays, and each sheet media detector generates a signal in response to detecting that the number of the copies of the document has been depleted from the initial quantity to the depleted quantity,
 wherein the means for storing stores a plurality of documents, and
 wherein the means for receiving the signal receives the signal from the sheet media detectors and, in response to receiving the signal and without user instruction, causes the means for printing to automatically print additional copies of the documents and place the additional copies in the output trays.

28. The document printing apparatus of claim 25, and wherein the means for receiving the signal automatically maintains at least a predetermined quantity of the number of copies of the document in the means for receiving.

\* \* \* \* \*